Patented May 30, 1933

1,911,222

UNITED STATES PATENT OFFICE

WALTER F. BOLLENS AND ROY C. NEWTON, OF CHICAGO, ILLINOIS, ASSIGNORS TO SWIFT & COMPANY, OF CHICAGO, ILLINOIS, A CORPORATION OF ILLINOIS

METHOD OF CHILLING SHORTENING AGENTS

No Drawing. Application filed September 3, 1930. Serial No. 479,588.

This invention relates to an improved process of chilling lard and other shortening agents whereby the shortening agents are given improved creaming and other qualities.

The common method of chilling lard and other shortening agents is to run the material in the form of a thin film on to a chilling roll cooled by brine or ammonia, with resulting conversion of the liquid material into a semi-solid condition such that it can be pumped and packaged, setting to a solid form almost immediately after packaging.

The present invention provides an improved process of chilling lard and other shortening products in which an improved product, having improved creaming qualities, is produced, and in which the size and shape of the crystals produced by the chilling operation are so altered, as compared with the ordinary chilled products, that the resulting semi-solid material when used in the preparation of cakes, icings, etc., will retain more air or moisture in a finely divided state.

We have discovered that if a fat is crystallized at a temperature slightly below its normal congealing point, the crystalline structure of the mass will be such as to give the fat the desired creaming qualities. According to a preferred method of carrying out the process the fat is super-cooled below its normal congealing point and discharged from contact with the chilling medium while still in the liquid state and then is allowed to solidify without further chilling. The temperature to which the fat is super-cooled is such that its heat of solidification will not quite suffice to bring it up to its normal congealing point.

The process of the present invention is applicable to different kinds of shortening, as, for example, natural hog lard, partially hydrogenized hog lard, shortening compounds prepared by mixing oils with stearine, hydrogenized shortening from vegetable oils, etc.

The apparatus employed for the rapid chilling and super-cooling of the liquid fat may vary in its construction but should be such that the liquid fat is rapidly cooled and comes in contact with a cold medium for only a short time, not long enough to allow solidification. The chilling operation is advantageously carried out in a continuous manner by passing the lard or other liquid shortening material through an internally cooled chilling machine in which it is rapidly cooled and super-cooled below its congealing point, after which the super-cooled material is discharged to the package where it is packaged in liquid form, after which it solidifies or "sets up" in the package. With different materials, the length of time required for solidification varies. It may take only a few seconds or minutes or it may remain relatively soft for several days before solidification. The initial crystallization will in any case take place rapidly as the heat of crystallization of part of the super-cooled product will rapidly raise the temperature of the super-cooled product from the temperature to which it is super-cooled in a liquid state to a temperature in the neighborhood of the normal congealing point after which such further crystallization as takes place will take place slowly at approximately the normal congealing point. The extent to which the initial crystallization, due to super-cooling, takes place will vary with the extent of the super-cooling and with the particular fat mixture being treated.

The new product produced by the new chilling process of the present invention has a different internal structure from that of products chilled on the ordinary chilling rolls. The structure of the new product consists of fine crystals set in a matrix of different phase. The structure of the new product is such that it has greatly improved creaming qualities. This product also has the important property of producing maximum cake volume. These properties make the new product particularly valuable in modern cake making and in making icings. For example, natural hog lard which, when chilled in the ordinary manner over chilling rolls or allowed to solidify naturally, creams to such a limited extent that the volume of a pound cake is barely 1000 cc. or less. When subjected to the improved chilling process of the present invention and converted into the new product of the present invention, it has such improved creaming qualities that a pound cake produced under the same conditions has a volume of from 1350 to 1400 cc. or more.

The invention will be further illustrated by the following specific example, but it will be understood that the invention is not limited thereto:

The shortening, such as lard, or partially hydrogenized lard, is melted and brought to a temperature somewhat near, but above, its congealing point, a temperature of about 120° F. usually being sufficient. This product is then passed very rapidly through a suitable chilling device and it is cooled to a temperature somewhat below its congealing point. The rate of passage of the material and the rate of cooling should be such that the product does not solidify on the chilling surfaces. In the case of lard, for example, the product is super-cooled to a temperature of around 65° F. or lower. The super-cooled product, while still in a liquid state, is then filled into containers, which may be regular shipping containers, and allowed to solidify in the containers without further chilling.

The lard or partially hydrogenated lard which has been treated in the manner described will rapidly solidify due to partial crystallization brought about by the supercooling as the heat of crystallization of part of the product raises the temperature of the lard from its super-cooled temperature to a temperature approximating the normal congealing point with the resulting production of a hard, brittle product which on further standing softens up to a semi-solid consistency somewhat resembling that of ordinary lard, but with improved creaming qualities which differentiate the product from ordinary lard.

It will thus be seen that the present invention provides an improved process of chilling lard and other shortening products in which the melted shortening is super-cooled to a temperature below its solidifying temperature and then permitted to solidify preferably without further chilling; and that this new chilling process gives a new chilled product of characteristic structure and of improved creaming and other properties.

We claim:

1. The method of chilling shortening products to produce semi-solid shortening products of improved creaming qualities which comprises rapidly supercooling the melted shortening below its congealing point and without effecting any appreciable crystallization, withdrawing the product from such cooling treatment while still in a fluid state and before any appreciable crystallization has taken place or heat of crystallization removed, the supercooling of the liquid product being such that the heat of crystallization will raise the temperature of the product to the neighborhood of its normal congealing point, and permitting the supercooled liquid product to crystallize whereby the product rapidly sets to a solid or semi-solid product out of contact with the chilling medium.

2. The method of chilling shortening products to produce semi-solid shortening products of improved creaming qualities which comprises rapidly supercooling the melted shortening, without appreciable crystallization or solidification thereof, to a temperature sufficiently below its normal congealing point that the heat of crystallization of part of its constituents will raise it to the neighborhood of its normal congealing point, withdrawing the supercooled product while still in a liquid condition and without appreciable crystallization from contact with the chilling medium, and permitting the supercooled product to solidify with rise of temperature due to crystallization to a temperature just below its normal congealing point.

3. The method of chilling lard to produce lard of improved creaming qualities which comprises chilling the melted lard by supercooling it rapidly, without appreciable crystallization thereof, to a temperature such that its heat of crystallization and solidification will raise the temperature to the neighborhood of its normal congealing point, withdrawing the supercooled lard while still in a liquid condition and without appreciable crystallization from contact with the chilling medium, and allowing it to solidify with rise in temperature from the supercooled state by the heat of crystallization to a temperature just below its normal congealing point.

4. The method of chilling shortening products to produce semi-solid shortening products of improved creaming qualities which comprises rapidly cooling the melted shortening, without appreciable crystallization or solidification thereof, to a temperature sufficiently below its normal congealing point that the heat of crystallization of part of its constituents will raise it to the neighborhood of its normal congealing point, withdrawing the supercooled product while still in a liquid condition and without appreciable crystallization from contact with the chilling medium, and permitting the super-cooled product to solidify with rise of temperature due to crystallization to a temperature in the neighborhood of its normal congealing point, the extent of the supercooling being such that the super-cooled product will rapidly solidify to a hard, brittle product which on standing will soften to semi-solid consistency.

5. The method of chilling lard to produce lard of improved creaming qualities which comprises chilling the melted lard by super-cooling it rapidly, without appreciable crystallization thereof, to a temperature such that its heat of crystallization and solidification will raise the temperature to the neighborhood of its normal congealing point, withdrawing the super-cooled lard while still in a liquid condition and without appreciable crystallization from contact with the chilling medium, and allowing it to solidify with rise in temperature from the supercooled state by the heat of crystallization to a temperature just below its normal congealing point, the extent of the supercooling being such that the supercooled product will rapidly solidify to a hard, brittle product which on standing will soften to semi-solid consistency.

In testimony whereof we affix our signatures.

WALTER F. BOLLENS.
ROY C. NEWTON.

CERTIFICATE OF CORRECTION.

Patent No. 1,911,222.                                              May 30, 1933.

WALTER F. BOLLENS, ET AL.

It is hereby certified that error appears in the printed specification of the above numbered patent requiring correction as follows: Page 2, line 93, claim 2, for "just below" read "in the neighborhood of"; and that the said Letters Patent should be read with this correction therein that the same may conform to the record of the case in the Patent Office.

Signed and sealed this 8th day of August, A. D. 1933.

M. J. Moore.
Acting Commissioner of Patents.

(Seal)

tle product which on standing will soften to semi-solid consistency.

5. The method of chilling lard to produce lard of improved creaming qualities which comprises chilling the melted lard by super-cooling it rapidly, without appreciable crystallization thereof, to a temperature such that its heat of crystallization and solidification will raise the temperature to the neighborhood of its normal congealing point, withdrawing the super-cooled lard while still in a liquid condition and without appreciable crystallization from contact with the chilling medium, and allowing it to solidify with rise in temperature from the supercooled state by the heat of crystallization to a temperature just below its normal congealing point, the extent of the super-cooling being such that the supercooled product will rapidly solidify to a hard, brittle product which on standing will soften to semi-solid consistency.

In testimony whereof we affix our signatures.

WALTER F. BOLLENS.
ROY C. NEWTON.

CERTIFICATE OF CORRECTION.

Patent No. 1,911,222. May 30, 1933.

WALTER F. BOLLENS, ET AL.

It is hereby certified that error appears in the printed specification of the above numbered patent requiring correction as follows: Page 2, line 93, claim 2, for "just below" read "in the neighborhood of"; and that the said Letters Patent should be read with this correction therein that the same may conform to the record of the case in the Patent Office.

Signed and sealed this 8th day of August, A. D. 1933.

M. J. Moore.
Acting Commissioner of Patents.

(Seal)

CERTIFICATE OF CORRECTION.

Patent No. 1,911,222.  May 30, 1933.

WALTER F. BOLLENS, ET AL.

It is hereby certified that error appears in the printed specification of the above numbered patent requiring correction as follows: Page 2, line 93, claim 2, for "just below" read "in the neighborhood of"; and that the said Letters Patent should be read with this correction therein that the same may conform to the record of the case in the Patent Office.

Signed and sealed this 8th day of August, A. D. 1933.

M. J. Moore.
Acting Commissioner of Patents.

(Seal)